United States Patent [19]

Griffin et al.

[11] Patent Number: 4,669,356
[45] Date of Patent: Jun. 2, 1987

[54] EJECTOR RELEASE UNIT

[75] Inventors: Dennis Griffin, Guildford; Arthur C. Bond, Weybridge, both of England

[73] Assignee: Frazer-Nash Limited, England

[21] Appl. No.: 400,572

[22] Filed: Jul. 21, 1982

[30] Foreign Application Priority Data

Jul. 22, 1981 [GB] United Kingdom ............ 8122572
May 21, 1982 [GB] United Kingdom ............ 8214589

[51] Int. Cl.$^4$ .......................... F41F 5/02; B64D 1/02
[52] U.S. Cl. .............................. 89/1.57; 224/137 A
[58] Field of Search .............. 89/1.5 F, 1.5 G, 1.5 B, 89/1.5; 244/137 A

[56] References Cited

U.S. PATENT DOCUMENTS

| 3,283,406 | 11/1966 | Varin et al. | 30/180 UX |
| 3,799,478 | 3/1974 | Costes et al. | 89/1.5 F X |
| 4,049,222 | 9/1977 | Peterson | 89/1.5 G X |
| 4,050,656 | 9/1977 | Peterson | 89/1.5 F X |
| 4,132,377 | 1/1979 | Schorr | 89/1.5 G X |
| 4,313,582 | 2/1982 | Hasquenoph et al. | 89/1.5 G X |

FOREIGN PATENT DOCUMENTS

2072812 10/1981 United Kingdom ............ 89/1.5 G

Primary Examiner—David H. Brown
Attorney, Agent, or Firm—Hall, Myers & Rose

[57] ABSTRACT

An aircraft ejector release unit (E.R.U.) is provided in which ejection is accomplished by a pair of angularly moving ejection arms carrying pivotal thrust pads and both mechanically actuated by a common gas-operated piston-and-cylinder unit. The gas piston operates a crank that turns a central lever assembly coupled by actuating rods to rotate triangular cranks disposed near opposite ends of the E.R.U. Control links pivotally mounted at their upper ends on the E.R.U. body are pivotally connected at their lower ends to the ends of the ejection arms, and when the triangular cranks are rotated the ejection arms are extended by unfolding of the ejection arms and the control links, there being a pivotal connection between each crank and the respective ejection arm at a location intermediate the ends of the arm. Before the ejection arms extend, initial movement of the central lever assembly unlocks store suspension hooks of the self-releasing, sear type. Provision is made for bolting-on crutch arm modules at the ends of the E.R.U.

12 Claims, 14 Drawing Figures

EJECTOR RELEASE UNIT

This invention relates to ejector release units (E.R.U.'s) for the ejection of stores from aircraft. Stores that are to be launched from aircraft in flight are commonly carried close against or semi-buried in the aircraft structure and, for this and other reasons, must be ejected to a position out clear of the aircraft structure before they can be launched.

In current E.R.U.'s the store is ejected by the simultaneous extension of a pair of gas-operated rams, spaced fore and aft, the energising gas being supplied by one or more gas cartridges. However, stores ejection will, in future, be required at ever higher aircraft speeds with increasingly stringent demands on E.R.U. performance, particularly in regard to terminal velocity and the pitch rate applied to the store. A higher standard of performance predictability will also be required.

Theoretically, increased ejection velocity can be achieved by existing techniques using higher gas cartridge performance and longer ejection rams. However, the need for extremely high pitch "stiffness" precludes the use of gas as a fluid for transmitting energy to the rams as is used in current E.R.U.'s. Gas-operated rams can only be throttled to provide predictable store pitch rate if all reacted loads are inertial. To obtain a predictable pitch rate which is independent of store inertial and aerodynamic forces, the ram positions must be controlled during and up to the end of ejection, against the influence of forces that will be a function of store mass, centre of gravity, moment of inertia and applied aerodynamic loads.

A hydraulic form of ram displacement control is a feasible solution, but has technical disadvantages which necessitate the use of two-stage ejection rams and high fluid velocities.

According to the present invention, there is provided an aircraft ejector release unit (E.R.U.) having fore and aft ejection arms both actuated by a single fluid-operated piston-and-cylinder unit through a mechanical linkage system. A mechanical linkage solution, as opposed to a hydraulic circuit, is considered to offer a number of advantages. Principally, these are: low technical risk, low maintenance, low initial cost, mechanical integrity and high reliability.

Arrangements in accordance with the invention will now be described, by way of example, with reference to the accompanying drawings, in which.

Figure 1:
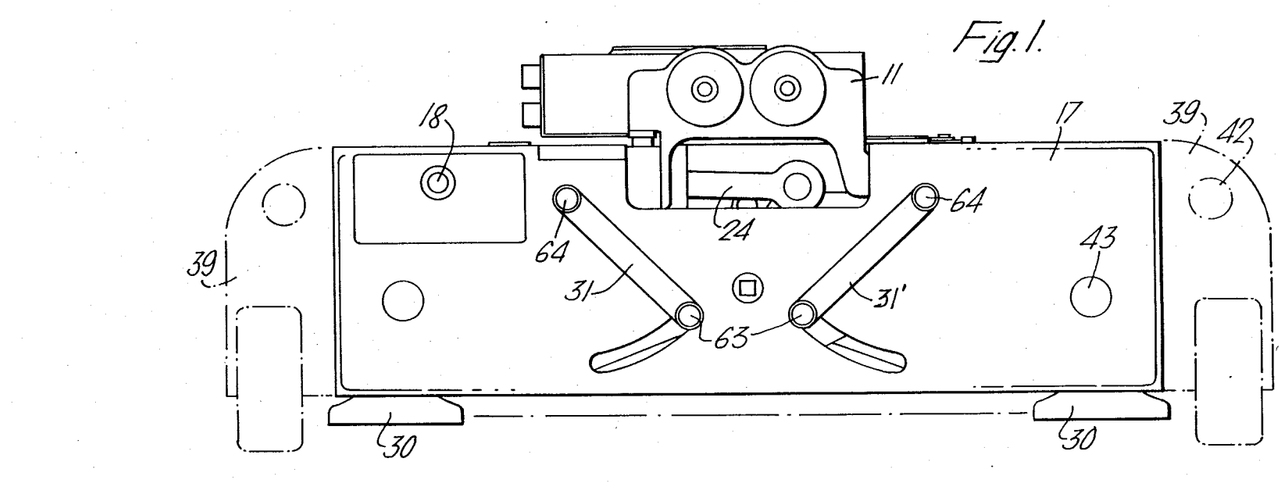
FIG. 1 shows an E.R.U. embodying the invention, in external side elevation.
Figure 2:
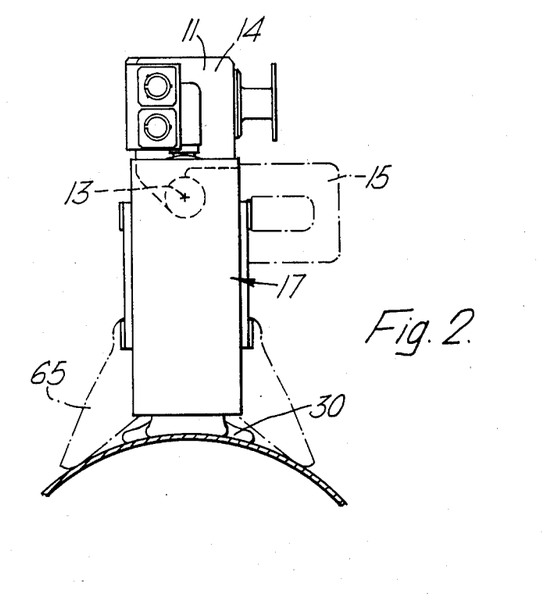
FIG. 2 is an end elevation.
Figure 3:
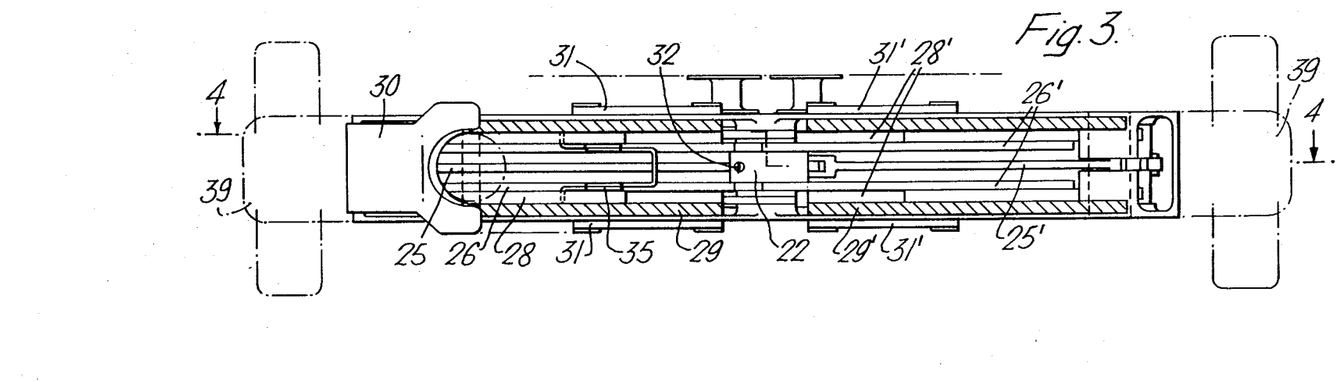
FIG. 3 is an underneath view, with parts of the ejection arms, one suspension hook and one thrust pad omitted for clarity.

Referring firstly to FIGS. 1 to 9, the E.R.U. shown has a breech housing 11 attached to a single gas-operated piston-and-cylinder unit 12, the assembly being pivotable about the piston axis 13 to provide a choice of two cartridge access positions (FIG. 2), viz:

(a) horizontal, as at 14, for pylon installations where height is not critical;
(b) vertical, as at 15, where installed height is more important and where access is primarily from below (e.g. for use with pallets).

The breech/piston assembly may be removed by operation of a spring catch 16 at one end of the assembly, followed by upward withdrawal from the main casing 17.

The gas piston 19 can be prevented from moving, when desired, by a ground safety pin 18, and the piston is arranged so that only a portion of its working area is exposed to gas pressure when the hook linkage is in the safe condition. This limits the loads experienced in a hang-fire situation.

The piston-and-cylinder unit 12 actuates an adjustable actuating lever assembly 22, pivotally mounted at 23, via a connecting link 24 that is pivotally connected to the piston 19 at 50 and to the lever assembly 22 at 51. The initial 10 mm of piston travel operates rods 25, 25' pivotally connected to the lever assembly 22 at 52 and 53, to release suspension hooks 20, 20' which, being of the sear type, are self-opening under load once sears 21, 21' have been unlatched, against the action of sear bias springs 27, by the rods 25, 25' connected to the sears by lost motion pivotal connections 54, 55. Continued movement of the piston 19 causes main operating tie rods 26, 26' pivotally connected to the lever assembly 22 at 56 and 57, to pull on ejection arm cranks 28, 28' at each end of the unit. Ejection arms 29, 29' bearing pivoted thrust pads 30, are then extended under the control of links 31, 31'.

Figure 4:
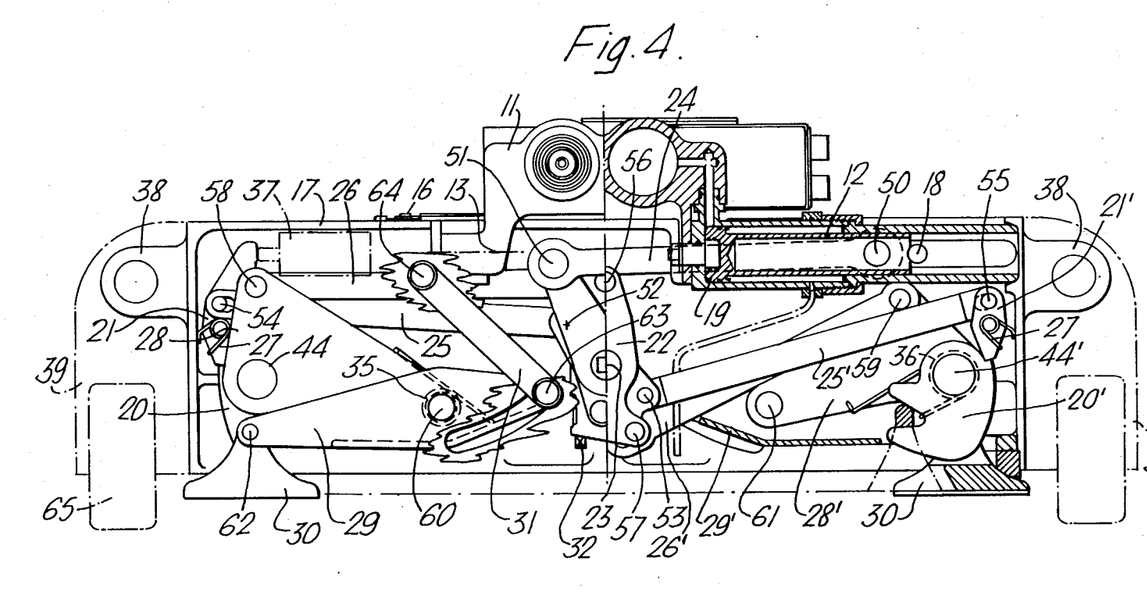
FIG. 4 is a view in split section on the line 4—4 of FIG. 3.

As seen in FIG. 4, in which the ejection arms 29 are retracted, the cranks 28, 28' are generally triangular with upper corners, lower outer corners and lower inner corners. The rods 26, 26' are connected to the cranks 28, 28' by pivotal connections 58, 59 at the upper corners, and the cranks themselves are mounted for angular movement on the E.R.U. main casing about pivots 44, 44' at their lower outer corners. The lower inner corners of the cranks 28, 28' are pivotally connected at 60, 61 to the ejection arms 29, 29' at positions intermediate the ends of the ejection arms. In the retracted condition, the ejection arms 29, 29' are substantially horizontal with the thrust pads 30 pivotally mounted on their outer ends at 62. The inner ends of the arms 29, 29' are pivotally connected at 63 to the lower inner ends of the control links 31, 31' which have their upper outer ends pivotally mounted at 64 on the E.R.U. main casing.

Figure 5:
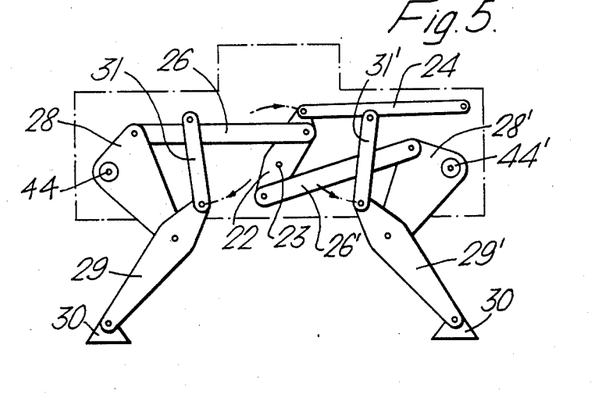
FIG. 5 is a diagrammatic elevation of the ejection arm operating mechanism, showing the ejection aKms fully extended.

Upon extension of the ejection arms 29, 29' the upper corners of the cranks 28, 28' are pulled inward by the rods 26, 26' the lower inner corners of the cranks, connected to the ejection arms, descend, and the ejection arms 29, 29' and links 31, 31' unfold to the position shown in FIG. 5.

Figure 7:
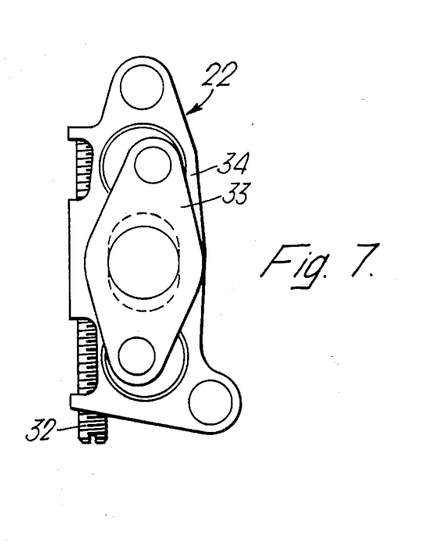
FIG. 7 is a detail view of an actuating lever assembly showing the adjustment provided for varying the attitude in pitch of a store at ejection.
Figure 8:
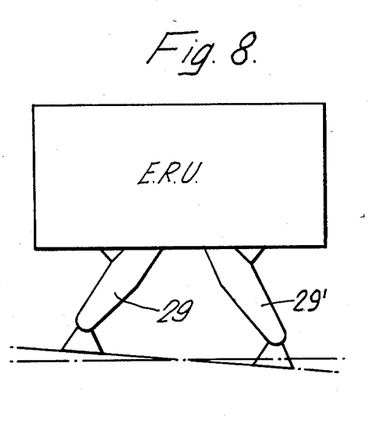
FIGS. 8 and 9 are diagrams illustrating the range of pitch adjustment.
Figure 9:
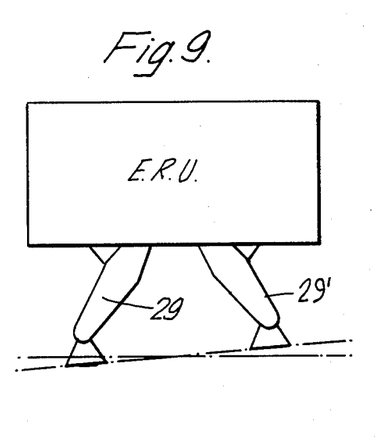
Figure 10:
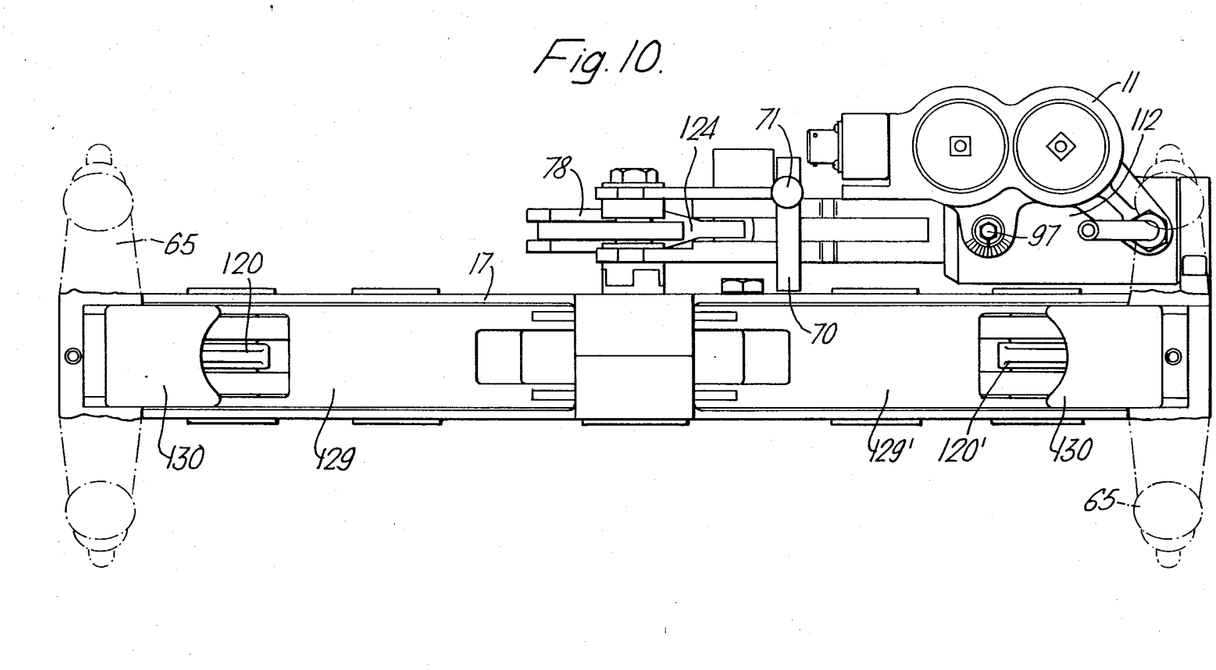
FIG. 10 is an underneath plan view of a second embodiment of the invention.
Figure 11:
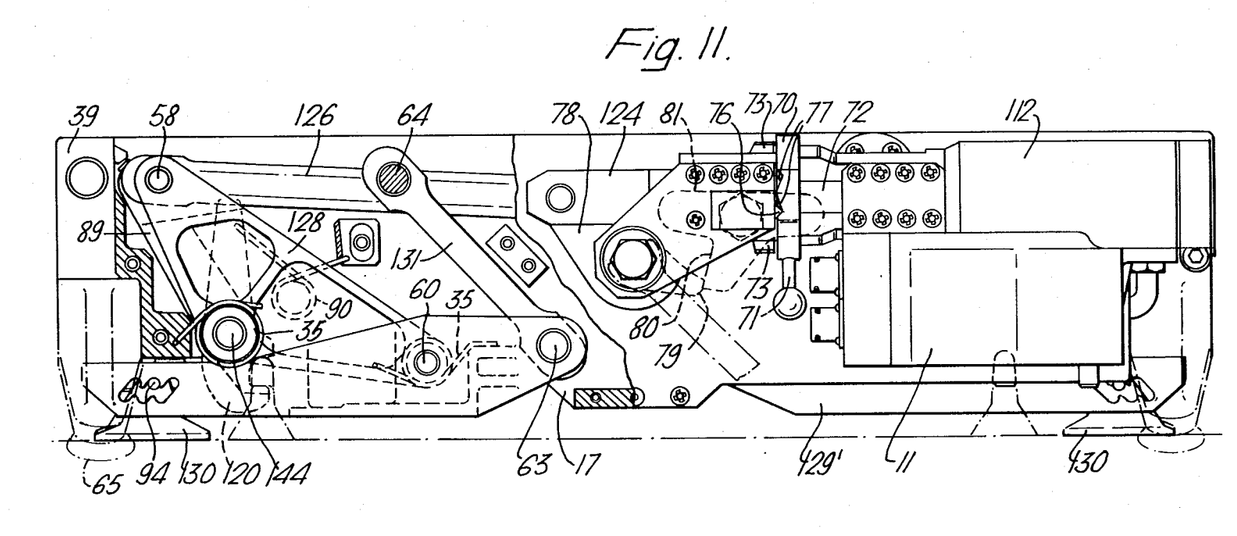
FIG. 11 is a side elevation of the embodiment of FIG. 10 with a casing side wall removed for clarity, showing the ejection arms retracted.
Figure 12:
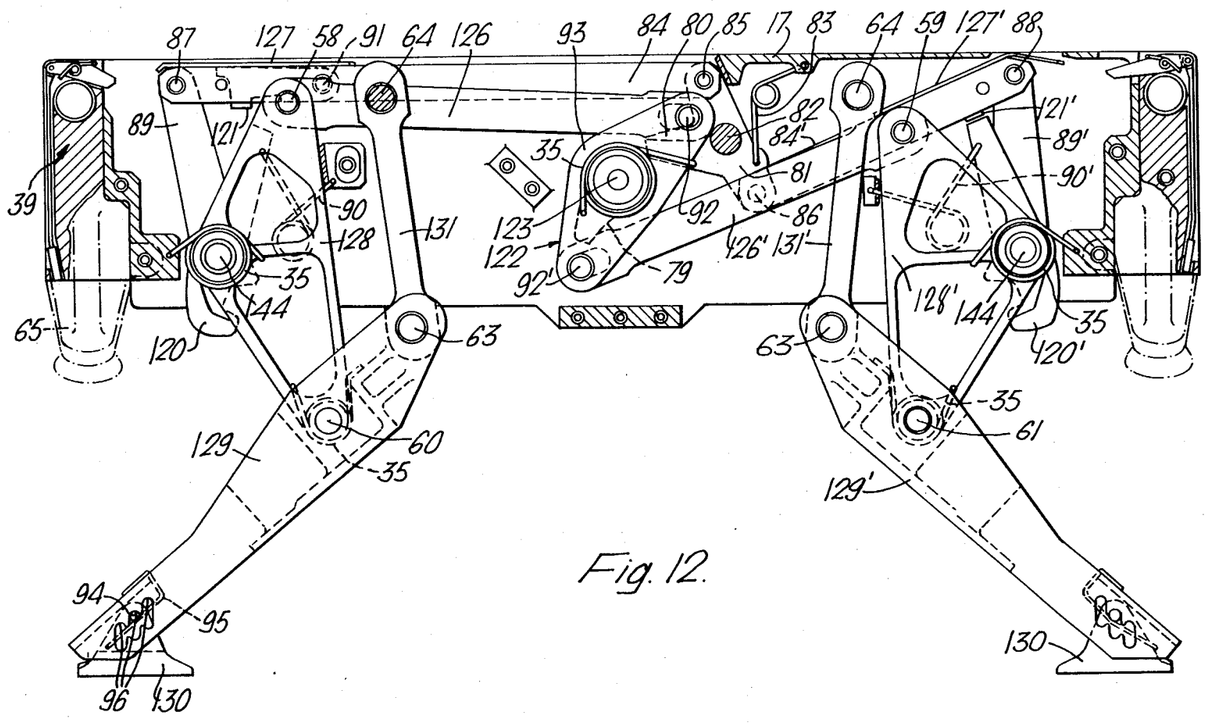
FIG. 12 is a side elevation with a casing side wall removed and the ejection arms extended.
Figure 13:
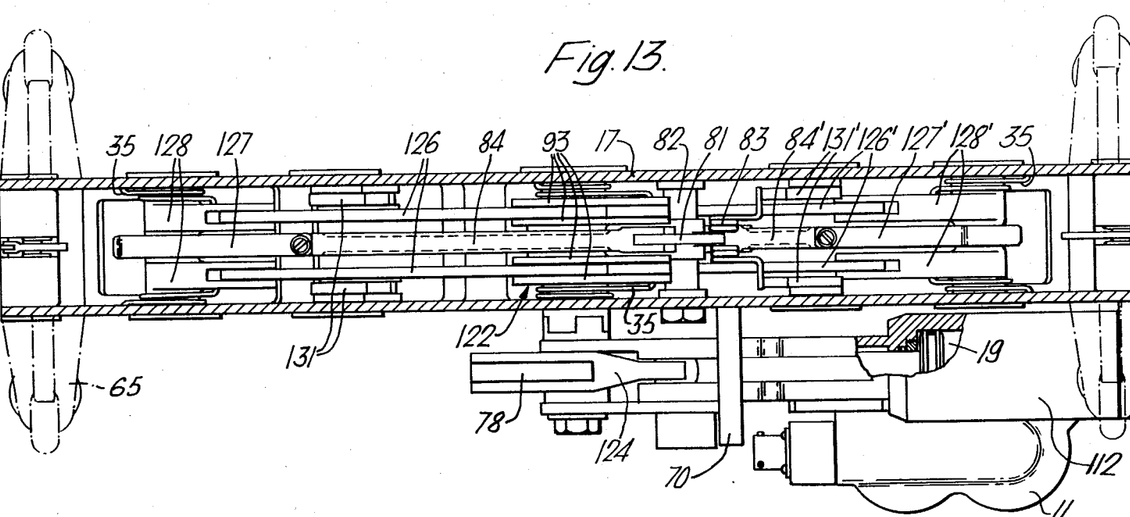
FIG. 13 is a top plan view with the top wall of the casing removed.
Figure 14:
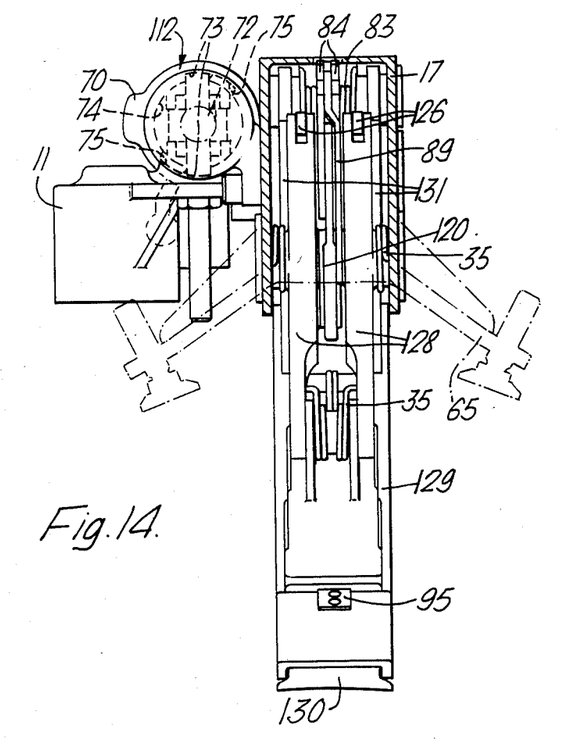
FIG. 14 is an end view with a crutching module removed and the ejection arms extended.

The relative displacement of the two tie rods 26, 26' is dependent upon the pivot position of the actuating lever 22 which can be pre-set by a pitch control screw 32. Referring to FIG. 7, relative movement of two parts 33, 34 of the lever assembly 22 is effected by turning the adjusting screw 32 to obtain zero pitch, nose-up pitch or nose-down pitch. This enables the relative amounts of angular movement of the arms 29, 29' to be controlled, to provide a terminal pitch angle at the arm feet, as shown in FIGS. 8 and 9. Such pitch angle develops within a predictable time, from which the pitch rate is calculable. The actuating lever assembly 22 can be set to give a range of ±5° pitch angle, which corresponds approximately to a ±2 rad/sec pitch rate.

The rods, links and cranks are shown as simple plates, but could be optimised as regards strength/weight ratio by the use of forgings or by providing lightening features. Springs 35, 36 provide retraction moments and bias the hooks 20, 20' to the open position.

Figure 6:
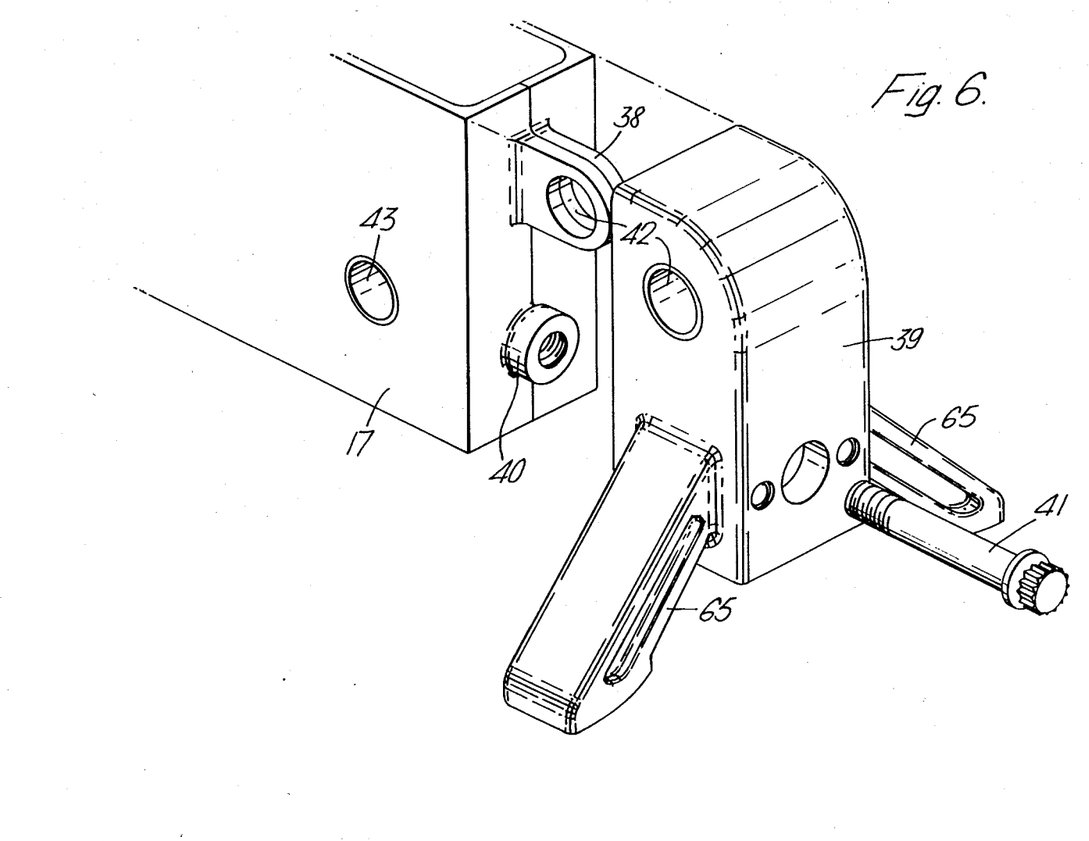
FIG. 6 is a diagrammatic pictorial view showing how crutching modules are bolted on to the ends of the E.R.U.

The mechanism is encased in a light alloy box consisting of two machined halves containing bearing bushes and stiffening webs. Space is provided for a "hooks open" indicating switch 37, if desired. At each end of the casing 17, there is provision for the attachment of a crutching module 39 having conventional crutch arms 65. As shown in FIG. 6, each crutching module 39 is located by a spigot 40 on the main box 17, receiving a securing bolt 41, and a lug 38 which incorporates an E.R.U. mounting bolt hole 42 shared by the crutching module and the main casing. Two other mounting bolt holes 43 (there are four in all) pass through the suspension hook/crank pivot bushes 44.

For very light or fragile stores, breech throttling or venting may be desirable to prevent damage due to excessive accelerations.

Maintenance of the unit is substantially limited to removal and cleaning of the breech/gas piston assembly and examination of its running surfaces and seals. Removal of this item is rapidly achieved by withdrawal of the spring catch 16 and of one headless pin. A chromium-plated piston is used in a stainless steel cylinder to reduce the amount of servicing of the piston-and-cylinder unit 12.

The use of dry lubricant in all bearings and pivots, with fluoro-carbon coatings on sliding link members, ensures that maintenance of in-service units is minimised to inspection only of mechanical components at infrequent intervals.

The designed mass of the unit, with manual crutching modules, is 16 kg. This is based on the use of steel for most components. The use of titanium for certain links and levers will significantly reduce this figure. Alternatively, the use of a higher grade steel will reduce both the mass and physical size of the unit.

In summary, the E.R.U. described and shown in FIGS. 1 to 5 is designed to give the following performance:

Terminal velocity - 4.3 m/s
Pitch rate - variable up to 2 rad/sec and substantially insensitive to reacted loads
Maximum store reaction - 40 KN for a 535 kg store
Other features and facilities are:
(a) Straight thrust ejection arms with non-sliding contact points on the store.
(b) Non-exotic metals for the major structural/linkage components, mainly 1200 MPa P.H. stainless steel.
(c) Alternative cartridge access points for pylon or pallet installations.
(d) Terminal pitch angle and rate infinitely adjustable over the range.
(e) Modular crutching arrangement providing a 'bolt-on' choice of conventional, screw-jack, or low drag manual or automatic crutch arms.
(f) Passive ejection arm retraction by torsion springs.
(g) Breech gas system removable without tools, for rapid servicing.
(h) Self-latching hooks, with independent hook latching.
(i) Space envelope only marginally greater than existing United Kingdom 14" E.R.U.'s.

Referring now to FIGS. 10 to 14, these show a second embodiment.

In this second embodiment, the gas-operated piston-and-cylinder unit 112 has a rotary safety lock 70 operated by a lever 71, which replaces the withdrawable flagged locking pin employed in the first embodiment. The piston rod 72 has a pair of wings 73 which abut a lock ring flange 74 when the rotary lock is in the locked position, but angular movement of the lock ring brings a pair of cut-outs 75 in the flange into alignment with the wings 73 so that the piston rod is freed. A spring-loaded detent pin 76 engages detect recesses 77 in the lock ring to locate it in the locked and unlocked positions.

The piston-and-cylinder unit 112 rotates an actuating lever assembly 122, pivotally mounted at 123, via a connecting link 124 and an external crank 78. During the first part of the piston travel, a wedging member 79 on the actuating assembly 122 swings out of engagement with a hook release sear 80 on a hook linkage crank 81 mounted on a pivot 82 and biassed by a hook linkage spring 83. Consequent release and rotation of the hook linkage crank 81 operates links 84, 84' each of which has one end pivotally connected at 85 or 86 to the crank 81 and its opposite end articulated at 87 or 88 to the upper end of a respective further link 89, 89' that is pivotally mounted at its lower end on the pivot 144 of a respective suspension hook 120, 120'. The suspension hooks 120, 120' are of the sear type and are selfopening under load, with the assistance of springs 90, 90' once the sears 121, 121' pivotally connected to the links 84, 84' at 91, have been unlatched against the action of sear bias leaf springs 127, 127'. While this is occurring, lost motion provided at pin-and-slot connections 92, 92' of a double-armed operating crank 93, of the lever assembly 122, to main operating rods 126, 126' is taken up. Continued movement of the piston then causes the main operating rods 126, 126' to turn the ejection arm cranks 128, 128'. The ejection arms 129, 129 are then extended under the control of links 131, 131'.

In this embodiment, instead of the screw adjustment of the lever assembly 122, the ram thrust pads 130 are adjustable in position on the ejection arms 129, 129' in order to control the pitch attitude of the store on ejection to obtain the zero pitch, nose-up pitch or nose-down pitch. The pivot pin 94 of each thrust pad 30 is retained by a spring 95 in one of a choice of three successive positions 96 along the end of the ejection arm. By this means, a predetermined terminal pitch angle is achieved at the thrust pads.

For very light or fragile stores, a gas throttle 97 is provided adjustable by the armourer. Normally, the piston extends in 50 milliseconds but the retraction is comparatively slow, taking about a second.

We claim:

1. An aircraft ejector release unit (E.R.U.) including:
   a horizontally elongated E.R.U. body,
   fore and aft ejection arms,
   pivotal coupling means connecting said fore and aft ejection arms to said E.R.U. body adjacent opposite ends of said body said pivotal copuling means enabling said ejection arms to perform angular extension and retraction movements relatively to said body,
   a single gas-operated piston-and-cylinder unit mounted on said E.R.U. body, and
   a mechanical linkage system operatively connecting said piston-and-cylinder unit and said fore and aft ejection arms whereby said single piston-and-cylinder unit actuates both said fore and aft ejection arms simultaneously,
   said mechanical linkage system comprising a central rotary lever assembly pivotally mounted on said E.R.U. body,
   coupling means coupling said central rotary lever assembly to said piston-and-cylinder unit for rotation thereby,
   two substantially triangular crank members pivotally mounted on said E.R.U. body near opposite ends thereof,
   and two connecting rods respectively coupling said substantially triangular crank members to said central lever assembly for rotation thereby.
   each said ejection arm having a pivotal connection to a respective one of said crank members so as to be extended as the respective crank member is rotated.

2. A unit according to claim 1, wherein the terminal pitch angle on ejection is selectable by means of a screw adjustment that adjusts the relative positions of two parts of the central lever assembly.

3. A unit according to claim 1, wherein the axis of the piston-and-cylinder unit is generally horizontal and comprising a breech assembly to contain gas cartridges for the supply of energising gas to the piston-and-cylinder unit which breech assembly is angularly adjustable through 90° about the axis of the piston-and-cylinder unit.

4. A unit according to claim 1, further comprising bolt-on crutching modules, providing crutch arms for the store, at opposite ends of the E.R.U.

5. A unit according to claim 1, wherein each ejection arm has one end pivotally connected to one end of a respective control link which control link has its other end pivotally mounted on the E.R.U. body, the opposite end of the ejection arm carries a pivotally mounted thrust pad, and the connection to the respective crank member lies intermediate the ends of the ejection arm.

6. A unit according to claim 5, wherein the position of the pivot of each thrust pad along the end of the respective ejection arm is adjustable to enable the terminal pitch angle on ejection to be selected.

7. A unit according to claim 1, wherein releasable safety means is provided to lock the piston against movement.

8. A unit according to claim 7, wherein the releasable safety means comprises lateral abutments on the piston rod and a locking ring that is angularly adjustable from a position in which it bars movement of the abutments to a release position in which cut-outs in the locking ring come into alignment with the abutments.

9. A unit according to claim 1, further comprising 'store' suspension hooks pivotally mounted on the E.R.U. near opposite ends thereof, which hooks are held locked by sears and are self-releasing when the sears are unlatched.

10. A unit according to claim 9, including actuating means whereby initial angular movement of the central lever assembly unlatches the sears.

11. A unit according to claim 10, wherein the actuating means comprise hook release rods each pivotally connected at one end to the central level assembly and at the other end to a respective sear.

12. A unit according to claim 10, wherein the actuating means comprise a hook release crank, links coupling the hook release crank to the sears, and a wedging member on the central lever assembly co-operating with a further sear face on the hook release crank.

* * * * *